United States Patent Office
2,915,290
Patented Dec. 1, 1959

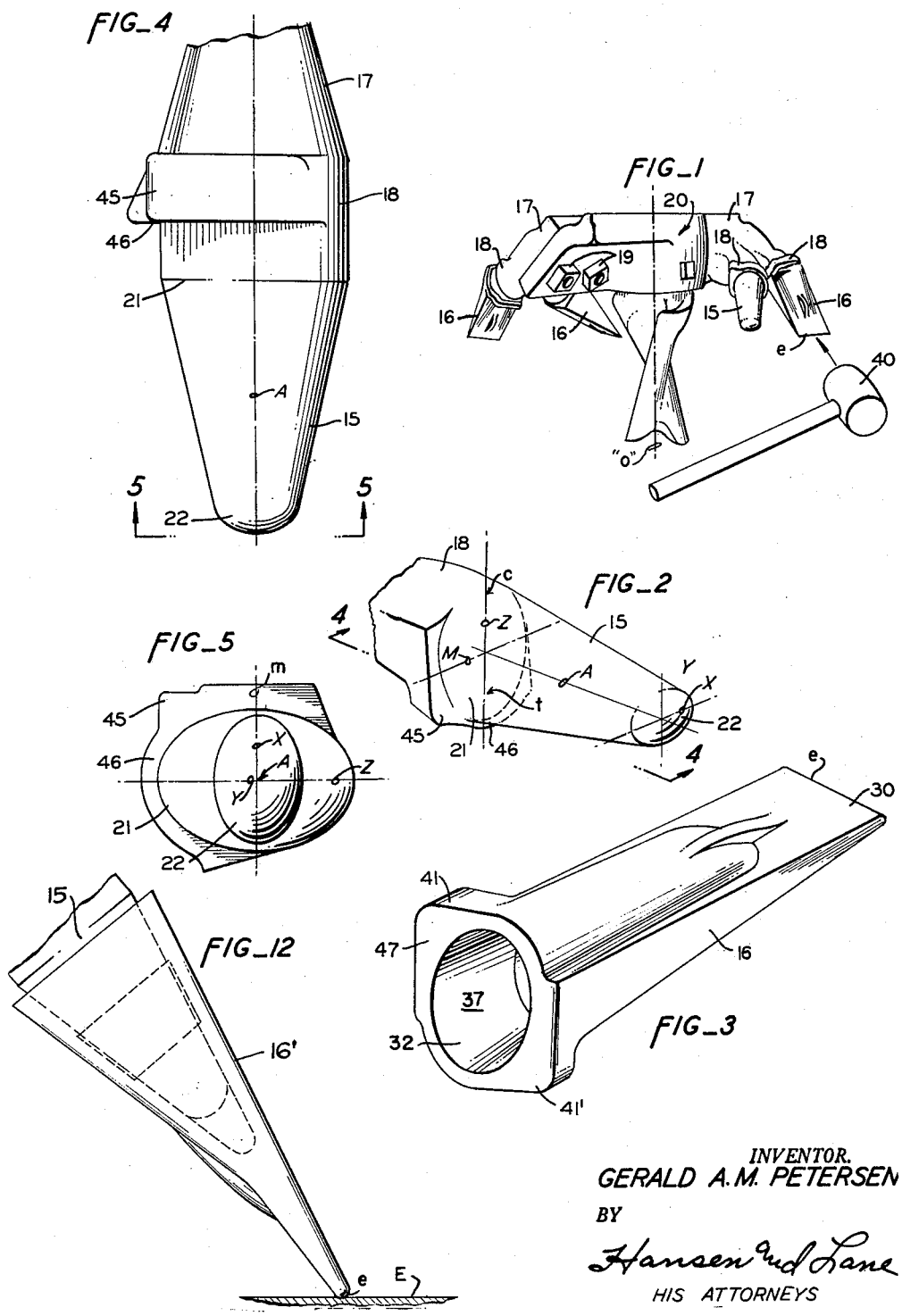

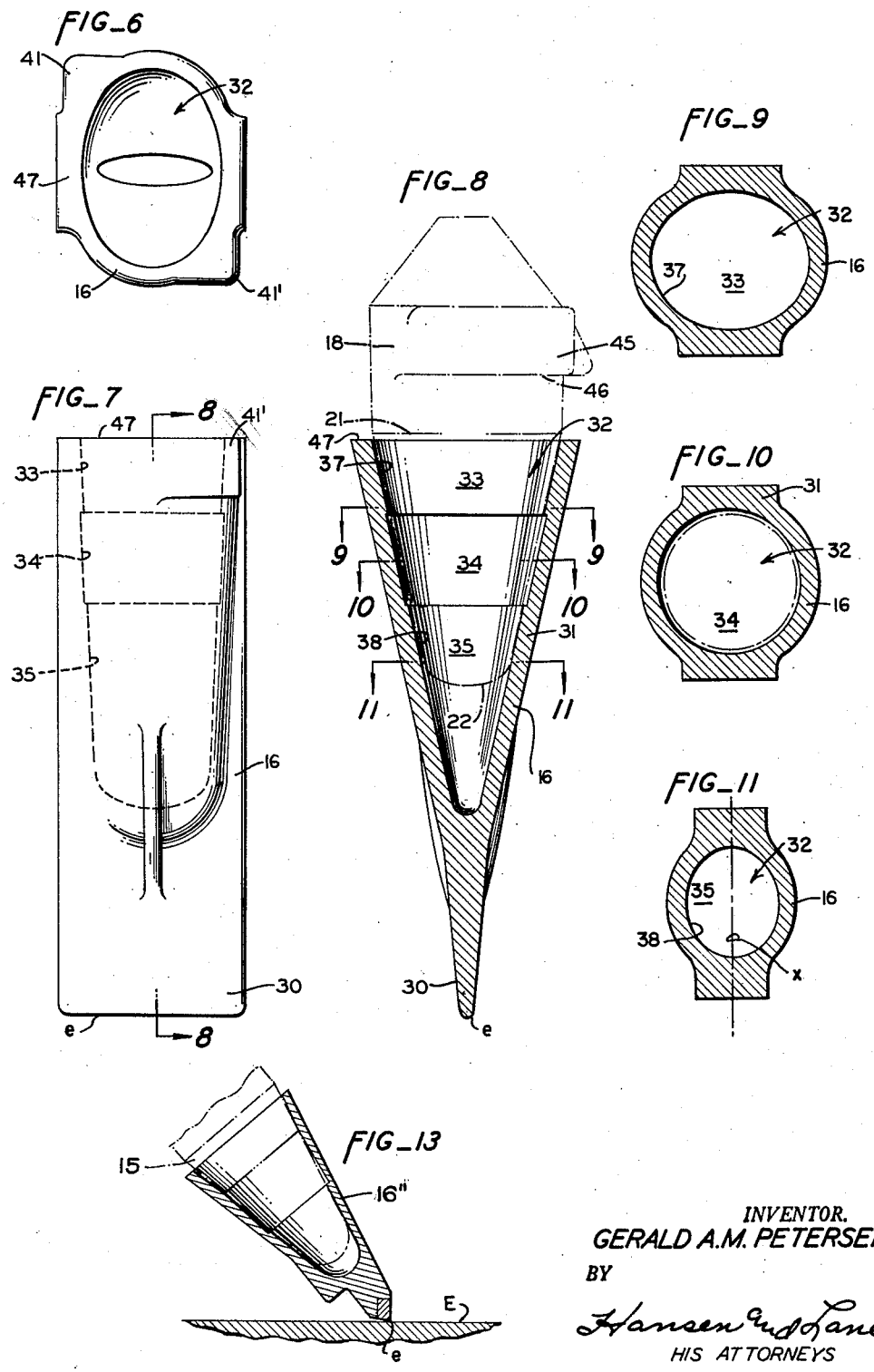

2,915,290

TRANSVERSE ELLIPSE TAPERED SHANK AND TOOTH FOR EARTH WORKING IMPLEMENTS

Gerald A. M. Petersen, Santa Clara, Calif.

Application April 18, 1955, Serial No. 501,804

6 Claims. (Cl. 255—70)

This invention relates to earth cutting or boring implements and more particularly to the connection between a replaceable cutting tooth and a mounting shank therefor.

The invention herein is more especially concerned with cutting teeth and shanks therefor embodied in earth boring augers such as the one described and claimed in my U.S. Letters Patent No. 2,578,014, dated December 11, 1951.

In devices of this kind it is customary to provide a shank plate with a plurality of forwardly extending tooth supporting shanks on which cutting teeth are held in a position particular to the line or plane of cut desired. While the line of cut is basically axially of the tooth and shank, it is of the utmost importance that the cutting edge of each tooth be maintained in the desired plane to attain efficient cutting. The resistance of the earth to cutting entails various side thrusts as well as twists or torque upon the tooth and shank requiring great strength and counter thrusts which the present construction seeks to attain.

It is one object of the present invention to provide a shank and tooth with a dual ellipse shaped connection for securely keying the tooth to the shank.

Another object is to provide a shank having an enlarged elliptical base tapering to a reduced elliptical shaped tip which is transverse to the base. In connection with this feature it is a further object to provide such a shank in which the major axis of the elliptical tip is substantially comparable to the minor axis of the elliptical base. This object further contemplates a secure tapered fit of the tooth at the tip and base of the shank with a relief in the center zone which is more or less frusto conical in shape.

Another object is to provide a tapered shank and a comparable socketed tooth of dual ellipse construction having symmetry relative to its axis to facilitate reversal of the tooth relative to the shank. This object contemplates the adaptability of the shank to receive the tooth in either of two positions so that when the cutting edge of such tooth becomes worn on one of its faces it may be turned and remounted on the shank to present the unworn face of its cutting edge to earth.

Another object is to provide a tooth and shank connection of the tapered fitting type with strike-off lugs or ears at a position to facilitate removal of the tooth from a shank. This object further contemplates the provision of a guard or shield on the shank conforming to the strike-off lug as well as the rearward face of the tooth to prevent accidental removal of the tooth by snagging of the latter during reverse turning of the auger.

These and other objects and advantages of the present invention will become apparent in the following description in the light of the drawing in which:

Fig. 1 is a perspective view of the pilot end of an auger provided with shank plates having shanks and teeth embodying the present invention.

Fig. 2 is a perspective view of one of the shanks of Fig. 1 at enlarged scale.

Fig. 3 is a perspective view of a tooth adapted to fit the shank of Fig. 2.

Fig. 4 is a side view of the shank of Fig. 2 as seen from line 4—4 of the same.

Fig. 5 is an end view of the shank of Fig. 4 as seen from line 5—5 thereof.

Fig. 6 is an end view of the open end of the tooth of Fig. 3.

Fig. 7 is an elevational view of the tooth of Figs. 3 and 6.

Fig. 8 is a longitudinal section through Fig. 7 taken along line 8—8 thereof and showing the shank in phantom.

Fig. 9 is a transverse section through Fig. 8 taken along line 9—9 thereof.

Fig. 10 is a transverse section through Fig. 8 taken along line 10—10 thereof.

Fig. 11 is a transverse section through Fig. 8 taken along line 11—11 thereof.

Fig. 12 is a tooth similar to that of Fig. 3 having a modified tip.

Fig. 13 is another form of tooth provided with a carbide cutting edge or tip.

Referring now to Fig. 1 of the drawing showing a preferred embodiment of the invention on an auger, the shank is designated 15 and the tooth 16. In this disclosure several shanks 15 are shown to be secured to shank plates 17 in accordance with the teachings of U.S. Patent No. 2,578,014 previously mentioned. It should here be understood, however, that the shank and tooth connection of the present invention is not limited to the specific use depicted. As is the practice each tooth 16 has a straight chisel-like cutting edge e formed along one end, the opposite end being provided with a socket 32 adapted to receive a shank 15.

As best illustrated in Fig. 2 each tooth shank 15 is cast integrally with a mounting or shank plate 17 adapted to be secured, as for instance by bolts 19, to an earth working implement 20 for movement therewith. The shanks 15 extend lengthwise from the shank plate 17 in the direction of movement thereof. Thus it will be seen that the long axis A of each shank extends from aft to fore direction.

That end of the shank 15 connected to the mounting or shank plate 17 is provided with a shoulder portion 18 the purpose of which will become apparent later in this description. Beyond the shoulder portion 18 each shank 15 is developed about its longitudinal axis A. Each tooth 16 has a base 21 adjacent the shoulder portion 18 and a tip 22 at its opposite or free end.

As seen in Fig. 1, the earth working implement 20 is a boring head which turns about an axis O which for purposes of this description will be considered as vertically disposed. Thus it will be seen that each shank plate 17 is radially disposed relative to the axis O about which they swing. In accordance with the teachings of Patent No. 2,578,014, each shank 15 is disposed with its axis A tangentially of an arc struck on a radius from the axis O of the boring head 20. Thus it will be appreciated that each shank 15 extends lengthwise in advance of its shank plate relative to the direction of movement thereof about the axis O of the boring head. The free end of the shank 15 is thus disposed in a leading direction so that the tooth 16 or 16' thereon is moved, cutting edge first, toward earth or other material being bored.

As illustrated in Figs. 1, 12 and 13 the cutting edge e of each tooth 16 spans the full width thereof. This cutting edge e is presented to earth E in the manner as shown in Figs. 12 and 13 so that the chisel-like edge cuts into the earth to shave or chip the same off in a well known manner. It will thus be appreciated that the tooth 16 is disposed at an oblique angle relative to its direction of movement, the cutting edge e being lowest and foremost during cutting action. In connection with the foregoing it will be noted that the shank 15 is disposed diagonally, i.e., at an angle relative to the path of movement of the cutting edge of the tooth 16 or 16' relative to earth. It may therefore be said that each shank 15 projects forwardly and extends downwardly from the shank plate with which it is formed. It will thus be seen that the longitudinal axis A of each shank is disposed in a plane which is tangent to the arcuate path of the tooth 16 as it moves about the axis O of the boring head 20. The base end 21 of the shank 15 is of elliptical shape in cross section as is the tip end 22 of the shank. The major axis Z of the elliptical base 21 is disposed perpendicular to the axis A of the shank and is included in a vertical plane which also includes the axis A of the shank 15. It therefore follows that the major axis Z of the elliptical base lies in the path of movement of the shank as it is moved about the axis O of the boring head 20. The cutting edge e of the tooth 16 is disposed transverse to the direction of movement of the shank upon which it is mounted. Consequently, although the major axis of the base 21 of each shank leans forwardly at an angle of approximately 45° due to the angular disposition of the shanks relative to the boring head 20, it follows that the cutting edge e of each tooth will be transverse to the major axis Z and/or parallel to the minor axis M of the base 21 of the shank upon which such tooth is mounted. This is shown in Figs. 12 and 13 wherein E represents earth engaged by the cutting edge e of the tooth 16 or 16' as the case may be.

From the foregoing it will be appreciated that as the cutting edge e of each tooth engages earth E a resistance to cutting thrust is exerted against the shank 15. Thus it will be seen that a greater resistance to bending moment is offered by reason of the disposition of the major axis Z of the base 21 in a plane which is transverse to the cutting edge e as well as to the thrust exerted upon the same by the earth during cutting. Moreover the minor axis M of the base bisects the major axis Z thereof and therefore is at the axis of rotation between the compressive side and the tension side of the elliptical base 21.

With the foregoing in mind it will be appreciated by those skilled in the art that as the flat cutting edge e of the tooth 16 engages the earth a bending moment is created at the base 21 of the shank 15; i.e., at its point of connection to the shank plate 17 and about the minor axis M at the base end of the shank. Now therefore it will be seen that during turning of the boring head 20 the teeth 16 each engage the earth in chisel-like fashion thus creating a rearwardly upwardly tending thrust against the cutting end of the tooth 16. This rearwardly upwardly tending thrust is transmitted to the shank 15 so that a bending moment is created at the base end 21 about the minor axis M. Since the thrust (resistance of earth to cutting) at the tip of the tooth 16 exerts a rearwardly upwardly tending force the bending moment about the minor axis M at the base of the shank creates compression in the lower half t of the base end 21 whereas the tension is created in the upper half C thereof. Thus it will be seen that the major strain at the elliptical base 21 of the shank is compensated for by disposing the major axis Z thereof in a plane common to the axis A of the shank and to the direction of this pressure or cutting thrust exerted by the earth against the tooth.

The tip end 22 of the shank 15 is likewise of elliptical shape to provide a major axis X and a minor axis Y thereon. The major axis X of the elliptical tip 22 is substantially comparable although slightly smaller in dimension than the minor axis M of the elliptical base 21 and as seen in Fig. 5 is disposed in a plane congruent to the minor axis M of the base. In this manner the elliptical tip 22 of the shank affords the broadest possible support in a direction parallel to the cutting edge e of the tooth 16 the same which is transverse to the plane in which a thrust is exerted upon the cutting end of the tooth as well as the tip of the shank 15. That is to say, the elliptical tip presents its broadest dimension in shovel fashion to the earth engaging end of the shank and tooth assembly.

The tooth 16 may be a straight chisel-type blade 30 as illustrated in Figs. 1, 3 and 8. The tooth 16 may be of different form such as the one 16' shown in Fig. 12 or the one 16" shown in Fig. 13. Irrespective of the type or form of tooth the latter is provided with a main body 31 having a socket 32 formed at one end thereof to fit upon the shank 15 of the present invention.

Referring now to Figs. 8 through 11, the socket 32 in the end of the tooth 16, 16' or 16", as the case may be, conforms in shape substantially in reverse of the shank 15. In each case the socket 32 has three principle zones 33, 34, and 35. Zone 33 adjacent the mouth 36 of the socket 32 (Figs. 8 and 10) is adapted to have tapered fit with the base one-third of the shank 15. Zone 35 of the socket 32 has its widest entry adapted for tapered fit with the tip one-third of the shank 15. It should here be noted that the tip receiving zone 35 of the socket 32 is of elliptical shape having its widest axis X' transverse to the tooth structure proper as best illustrated in Fig. 11. In this manner maximum strength is attained crosswise the cutting end of the tooth 16 while minimum thickness is attained between the top and bottom faces of the tooth.

The zone 34 between the entrance zone 33 and the tip receiving zone 35 of the socket 32 is that area thereof in which the vertical ellipse is converted to a transverse ellipse. Consequently, as seen in Fig. 10, the mid stratum of zone 34 is of circular shape. Since this medial zone 34 is a conversion zone and likely to create a problem in accurate surface contact for a good tapered fit, it is preferably set back, i.e., recessed relative to the normal line of the inner face 37 of zone 33 as well as the inner face 38 of zone 35 so as to be nonengaging relative to the conversion zone 34 of the shank. Thus it will be seen that no surface contact is afforded between the shank 15 and tooth 16 at the medial zone 34. In this manner a good tapered fit is affforded at zones 33 and 35 relative to the shank 15 and the possibility of wobbling of the tooth 16 relative to the shank is avoided.

Referring now to Fig. 1 it will be noted that each tooth 16 is adapted to be firmly driven onto a shank 15 by blows from a soft metal mallet 40. Thus the tapered inner faces 37 and 38 of the base and tip zones 33 and 35 respectively of the socket 32 are firmly and frictionally engaged with the corresponding outer faces of the shank 15. In this manner the teeth 16 are sceured to their respective shanks 15, it being remembered that the teeth are moved cutting edge foremost against the earth being bored so that the teeth are always pressed firmly upon the shank 15.

In connection with the foregoing, it will be noted that each tooth 16 is provided with a strike-off ear 41—41' adjacent each of diametrically opposite quadrants of its base or mouth end. These ears are so disposed (see Fig. 1) adjacent the upper surface of the shank plate 17 as to facilitate striking of the ear by the mallet 40 to drive the tooth 16 off of the shank 15 upon which is is mounted. Since the teeth 16 are designed for reversal when worn as previously explained to present a sharpened cutting edge to earth, one of the ears 41 or 41' will of necessity be disposed adjacent the underside of the shank plate 17. Consequently, one of the strike-off ears 41 will scrape over the earth being bored and therefore be vulnerable to a tooth removing thrust should the auger be reversed for withdrawal. Such thrust of earth or a stone embedded therein against the lowermost ear 41 could cause accidental removal of a tooth 16 from its shank during reverse operation of the auger. To overcome such accidental removal of a cutting tooth 16, each shank 15 has a guard lug 45 (Figs. 2, 4 and 5) formed integrally with its shoulder portion 18 adapted to register with that strike-off ear 41 which is exposed to the underside of the shank plate 17. Moreover, the shoulder portion 18 is provided with a face 46 on the underside of shank plate 17 conforming in shape to that face 47 on the mouth end of the tooth disposed opposite the same (Figs. 1, 5 and 8). Thus it will be seen that when the shank plate glides over the earth being bored, the face 47 as well as that strike-off ear 41 which is exposed to earth will be guarded or shielded in such a manner to prevent the tooth 16 from being accidentally removed during reverse turning of the auger.

From the foregoing it will be appreciated that I have provided a shank and tooth connection which is simple and economical in construction yet highly efficient in use and operation. The dual ellipse shank and conforming socket in the tooth is such as to attain maximum strength and to withstand the major vertical thrust or bending moment at the base of the shank. Moreover, the transversely broader tip end of the shank serves to support the cutting edge of the tooth in the desired position while engaging earth. This affords greater resistance to torque or twisting of the tooth should either side zone on its leading face or its side edges engage rock or other obstructing objects.

In addition to the foregoing, since the major axis X of the elliptical tip is transverse to the major axis Z of the elliptical base and almost comparable in dimension to the minor axis M of the latter except for a very slights tapering it will be apparent that no broadening of the cutting tooth 16 is required throughout its length.

By reason of the symmetry in the shank 16 as well as the socket 32 in the tooth 15 it will be appreciated that the tooth can fit upon the shank with either face of the tooth up or down. The adaptability of this tooth and shank connection to various forms and types of pilot teeth is apparent from the disclosures in Figs. 12 and 13 either of which may be reversely mounted upon the shank to present a sharpened cutting edge to the earth to be bored.

While I have described my new tooth-shank connection in specific detail it will be appreciated that it is susceptible to variation, modification and/or alteration without departing from the spirit of my invention. I therefore desire to avail myself of all variations, modifications and/or alterations as fairly come within the purview of the appended claims.

What I claim as new and desired to protect by Letters Patent is:

1. In earth boring equipment of the type having a shank tapered from its base to its tip and its longitudinal axis disposed at an oblique angle relative to the direction of movement of said shank, and a replaceable tooth with conforming socket mounted thereon having a broad, chisel-like cutting edge supported by said shank in a substantially horizontal plane to engage earth for cutting the same; a dual ellipse tapered connection between said shank and tooth with conforming socket comprising an elliptical tip at the free end of said shank having its major axis disposed parallel to the cutting edge of the tooth mounted on said shank, and an elliptical base at the point of connection of said shank to said tool, said elliptical base having its major axis disposed perpendicular to the longitudinal axis of said shank transverse to the major axis of said elliptical tip and included in a substantially vertical plane which also includes the longitudinal axis of said shank.

2. In earth boring equipment of the type having a shank tapered from its base to its tip and its longitudinal axis disposed at an oblique angle relative to the direction of movement of said shank, and a replaceable tooth with conforming socket mounted thereon having a broad, chisel-like cutting edge supported by said shank in a substantially horizontal plane transverse to the longitudinal axis of said shank to engage earth for cutting the same; a dual ellipse tapered connection between said shank and tooth with conforming socket comprising an elliptical tip at the free end of said shank having its major axis disposed parallel to the cutting edge of a tooth mounted on said shank, and an elliptical base at the point of connection of said shank to said tool, said elliptical base having its major axis disposed perpendicular to the longitudinal axis of said shank and included in a substantially vertical plane which also includes the longitudinal axis of said shank for counteracting the tendency of bending of said shank at said base due to the resistance of earth to cutting by the cutting edge of said tooth.

3. In earth boring equipment of the type having a shank tapered from its base to its tip and its longitudinal axis disposed at an oblique angle relative to the direction of movement of said shank, and a replaceable tooth with conforming socket mounted thereon having a broad, chisel-like cutting edge supported by said shank in a substantially horizontal plane to engage earth for cutting the same; a dual ellipse tapered connection between said shank and tooth with conforming socket comprising an elliptical tip at the free end of said shank having its major axis disposed parallel to the cutting edge of the tooth mounted on said shank, and an elliptical base at the point of connection of said shank to said tool, said elliptical base having a minor axis parallel to the major axis of said elliptical tip and of slightly greater dimension with respect thereto, said elliptical base having its major axis disposed perpendicular to the longitudinal axis of said shank and included in a plane which also includes the longitudinal axis of said shank whereby the transverse disposition of said elliptical base and tip cooperate with the conforming socket of the tooth mounted on said shank to torsionably counteract twisting of said tooth relative to said shank.

4. In earth boring equipment of the type having a shank tapered from its base to its tip and its longitudinal axis disposed at an oblique angle relative to the direction of movement of said shank, and a replaceable tooth with tapering socket mounted thereon having a broad, chisel-like cutting edge supported by said shank in a plane substantially transverse to the direction of movement of said shank and tooth for engaging earth and cutting the same; a dual ellipse tapered connection between said shank and tooth comprising an elliptical tip at the free end of said shank having its major axis disposed parallel to the cutting edge of the tooth mounted on said shank, an elliptical base at the point of connection of said shank to said tool, said elliptical base having its major axis disposed perpendicular to the longitudinal axis of said shank transverse to the major axis of said elliptical tip and included in a plane which also includes the longitudinal axis of said shank, said tapering socket in said replaceable tooth presenting an elliptical base tapered facial zone and transverse tapering elliptical tip facial zone separated by a medial zone recessed relative to said base and tip tapered zones where the base ellipse of said shank converts into the ellipse of the tip of said shank.

5. In earth boring equipment of the type having a shank tapered from its base to its tip and its longitudinal axis disposed at an oblique angle relative to the direction of movement of said shank, and a replaceable tooth with tapering socket mounted thereon having a broad, chisel-like cutting edge supported by said shank in a plane substantially transverse to the direction of movement of said shank and tooth for engaging earth and cutting the same; a dual ellipse tapered connection between said shank and tooth comprising an elliptical tip at the free end of said shank having its major axis disposed parallel to the cutting edge of the tooth mounted on said shank, an elliptical base at the point of connection of said shank to said tool, said elliptical base having its major axis disposed perpendicular to the longitudinal axis of said shank transverse to the major axis of said elliptical tip and included in a plane which also includes the longitudinal axis of said shank, said tapering socket in said replaceable tooth presenting an elliptical base tapered facial zone and transverse tapering elliptical tip facial zone separated by a medial zone recessed relative to said base and tip tapered zones where the base ellipse of said shank converts into the ellipse of the tip of said shank, and a strike-off lug formed integrally at the base end of said tooth for facilitating removal of said tooth from said shank by a blow struck against said lug.

6. In earth boring equipment of the type having a shank tapered from its base to its tip and its longitudinal axis disposed at an oblique angle relative to the direction of movement of said shank, and a replaceable tooth with tapering socket mounted thereon having a broad, chisel-like cutting edge supported by said shank in a plane substantially transverse to the direction of movement of said shank and tooth for engaging earth and cutting the same; a dual ellipse tapered connection between said shank and tooth comprising an elliptical tip at the free end of said shank having its major axis disposed parallel to the cutting edge of the tooth mounted on said shank, an elliptical base at the point of connection of said shank to said tool, said elliptical base having its major axis disposed perpendicular to the longitudinal axis of said shank transverse to the major axis of said elliptical tip and included in a plane which also includes the longitudinal axis of said shank, said tapering socket in said replaceable tooth presenting an elliptical base tapered facial zone and transverse tapering elliptical tip facial zone separated by a medial zone recessed relative to said base and tip tapered zones where the base ellipse of said shank converts into the ellipse of the tip of said shank, and a guard lug formed integrally with the base end of said shank and on the underside thereof for registration with that strike-off lug which is lowermost on the tooth mounted on said shank for guarding the same against snagging during reverse movement of said tooth and shank assembly.

References Cited in the file of this patent
UNITED STATES PATENTS

| | | |
|---|---|---|
| 895,244 | Derrer | Aug. 4, 1908 |
| 2,578,014 | Petersen | Dec. 11, 1951 |